US009375771B2

(12) United States Patent
Fonte

(10) Patent No.: US 9,375,771 B2
(45) Date of Patent: *Jun. 28, 2016

(54) METHOD OF PRODUCING COLD-WORKED CENTRIFUGAL CAST TUBULAR PRODUCTS

(71) Applicant: ATI Properties, Inc., Albany, OR (US)

(72) Inventor: Matthew V. Fonte, Charlestown, MA (US)

(73) Assignee: ATI PROPERTIES, INC., Albany, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/657,253

(22) Filed: Mar. 13, 2015

(65) Prior Publication Data

US 2015/0183015 A1    Jul. 2, 2015

Related U.S. Application Data

(63) Continuation of application No. 13/937,207, filed on Jul. 8, 2013, which is a continuation-in-part of application No. 12/856,336, filed on Aug. 13, 2010, now Pat. No. 8,479,549.

(60) Provisional application No. 61/234,400, filed on Aug. 17, 2009.

(51) Int. Cl.
*B21C 37/30* (2006.01)
*B21B 21/02* (2006.01)
*B21B 17/02* (2006.01)
(Continued)

(52) U.S. Cl.
CPC .............. *B21C 37/30* (2013.01); *B21B 17/02* (2013.01); *B21B 21/02* (2013.01); *B21C 37/06* (2013.01); *B21J 5/02* (2013.01); *B22D 13/02* (2013.01); *C21D 7/10* (2013.01); *C22F 1/10* (2013.01);
(Continued)

(58) Field of Classification Search
CPC ........ B21B 21/02; B21B 17/02; B21C 37/06; B21C 37/30; B22D 13/02; B21J 5/02; C21D 7/10; F16L 9/02
See application file for complete search history.

(56) References Cited

U.S. PATENT DOCUMENTS 2,392,797 A    1/1946 Hackett
3,780,555 A *  12/1973 Balthazar et al. ............ 72/69
(Continued)

FOREIGN PATENT DOCUMENTS

CN    102330850 A    1/2012
EP      0233437 A    8/1987
(Continued)

OTHER PUBLICATIONS

Dornfeld, W.H., "Thick-Walled Cylinders and Press Fits", 2004 Retrieved from stressanalysis.ueuo.com/PressCylinderHam.pdf on Aug. 8, 2012, 17 pages.
(Continued)

*Primary Examiner* — Teresa M Ekiert
(74) *Attorney, Agent, or Firm* — K&L Gates LLP

(57) ABSTRACT

A method of making a seamless, tubular article comprises subjecting a cast tubular workpiece of a corrosion resistant alloy to at least about a 25% wall reduction at a temperature below a recrystallization temperature of the workpiece using a metal forming process comprising at least one of radial forging, rolling, pilgering, and flowforming. The cast tubular workpiece is a centrifugally cast tubular workpiece comprising an inner diameter and an outer diameter.

24 Claims, 12 Drawing Sheets

(51) Int. Cl.

| | |
|---|---|
| *B21J 5/02* | (2006.01) |
| *B22D 13/02* | (2006.01) |
| *B21C 37/06* | (2006.01) |
| *C21D 7/10* | (2006.01) |
| *C22F 1/10* | (2006.01) |
| *C22F 1/18* | (2006.01) |
| *B21D 22/16* | (2006.01) |
| *F16L 9/02* | (2006.01) |

(52) U.S. Cl.
CPC ............... *C22F 1/183* (2013.01); *B21D 22/16* (2013.01); *F16L 9/02* (2013.01)

(56) References Cited

U.S. PATENT DOCUMENTS

| | | |
|---|---|---|
| 4,161,112 A | 7/1979 | Stump |
| 4,317,271 A * | 3/1982 | Chakravarti ............... 29/527.6 |
| 4,478,787 A | 10/1984 | Nadkami et al. |
| 4,690,716 A | 9/1987 | Sabol et al. |
| 4,765,174 A | 8/1988 | Cook et al. |
| 4,819,471 A | 4/1989 | Cook |
| 4,846,392 A | 7/1989 | Hinshaw |
| 5,228,427 A | 7/1993 | Gardner, Jr. |
| 5,419,791 A | 5/1995 | Folmer |
| 5,469,481 A | 11/1995 | Adamson et al. |
| 5,558,150 A | 9/1996 | Sponseller |
| 5,657,659 A | 8/1997 | Yamada |
| 6,129,795 A | 10/2000 | Lehockey et al. |
| 6,386,010 B1 | 5/2002 | Irie et al. |
| 6,419,768 B1 | 7/2002 | Tverberg |
| 6,422,010 B1 | 7/2002 | Julien |
| 6,464,804 B2 | 10/2002 | Goecmen et al. |
| 6,880,220 B2 | 4/2005 | Gandy |
| 7,448,243 B1 | 11/2008 | Motsenbocker |
| 7,765,846 B2 | 8/2010 | Stueckrad et al. |
| 8,479,549 B1 | 7/2013 | Fonte |
| 2002/0121119 A1 | 9/2002 | Baensch et al. |
| 2007/0059460 A1 | 3/2007 | Abney et al. |
| 2008/0142268 A1 | 6/2008 | Downton et al. |
| 2008/0280691 A1 | 11/2008 | Stueckrad et al. |

FOREIGN PATENT DOCUMENTS

| | | |
|---|---|---|
| JP | S54-149012 A | 11/1979 |
| JP | S59-185724 A | 10/1984 |

OTHER PUBLICATIONS

International Tube, "Tubing Terms", Retrieved on Aug. 6, 2012 from www.internationaltube.com/files/glossary.pdf, 18 pages.

Michel, D.J. et al., "Mechanical Properties and Microstructure of Centrifugally Cast Alloy 718," Metallurgical Transactions A, vol. 16A, pp. 1295-1306, Jul. 1985.

Glasier et al., "Precission Seamless Cylinders by the Roll Extrusion Process", Kaiser Rollmet, A Kaiser Aerospace & Electronics Co., American Institute of Aeronautics and Astronautics, 20th Joint Propulsion Conference, Cincinnati, Ohio, Jun. 1984, 7 pages.

Standard Specification for Seamless, Welded, and Heavily Cold Worked Austenitic Stainless Steel Pipes, Designation A 312/A 312M-06, ASTM International, May 2006, 11 pages.

Corn, David L., "Roll Extruding Precision", Metal Progress, Jun. 1977, pp. 78-81.

* cited by examiner

METHOD OF PRODUCING COLD-WORKED CENTRIFUGAL CAST TUBULAR PRODUCTS

CROSS-REFERENCE TO RELATED APPLICATIONS

The present application claims priority as a continuation of U.S. patent application Ser. No. 13/937,207, filed on Jul. 8, 2013, which in turn claims priority as a continuation-in-part of U.S. patent application Ser. No. 12/856,336 filed Aug. 13, 2010, now issued as U.S. Pat. No. 8,479,549, which in turn claims priority to U.S. Provisional Patent Application No. 61/234,400 filed Aug. 17, 2009, the disclosures of each which are hereby incorporated by reference herein in their entirety.

TECHNICAL FIELD

The invention generally relates to seamless tubular components and, more particularly, the invention relates to producing high strength, composite seamless tubular components from centrifugally cast corrosion resistant alloys using compressive metal forming processes.

BACKGROUND ART

High strength, corrosion resistant, seamless tubular components have many commercial applications. For example, durable tubular components having high strength and resistance to failure under stress, corrosive, and erosive environments are used in oil country tubular goods (OCTG) and other types of tubular components used in the production of oil, gas or other fluids from a well. These durable components are needed due to the severe downhole conditions in the wells and/or the hostile environments surrounding the wells. However, as wells become deeper, the downhole conditions in the well may limit the choice of tubular components capable of withstanding these environment. Typically, deeper wells contain higher temperatures and pressures and may have corrosive atmospheres, e.g., hydrogen sulfide, carbon dioxide, chlorides, associated hydrocarbons, and/or acidic environments. Weight considerations may also be a concern since more tubular components must be used and joined together in the deeper wells.

As such, the material selection criteria for these tubular components has become increasingly important since they may fail in a relatively short time due to such factors as stress corrosion cracking, corrosive pitting, erosive wear and general wall loss, e.g., by lowering the component's burst and collapse pressures. Currently, high strength, corrosion resistant alloys have been used, rather than the traditional carbon steels, for the downhole tubular components in these kinds of severe conditions. These tubular components are typically made out of stainless alloys, duplex (austenitic-ferritic) stainless alloys, and nickel-based alloys, e.g., alloys such as alloy 28, 625, 718, 825, 925, G-3, 050, C-276, 22Cr, 25Cr, Nickel 200, Monel 400 and Inconel 600. A component's resistance to failure may be influenced by a number of factors that include the component material's chemistry, the nature and amount of alloying elements, the component's dimensions, such as thicker wall thickness to withstand higher burst and collapse pressures, and the material's microstructure which is influenced by the manufacturing process of the component, e.g., mechanical processing and the nature of any heat treatments of the component.

Tubular components may be formed by a number of different manufacturing processes. One type of manufacturing process is casting, by which a liquid material is usually poured into a mold and then allowed to solidify. The mold contains a hollow cavity having the desired shape of the component. The solidified part is also known as a casting, which is then removed from the mold usually once it has sufficiently cooled. Metals and alloys may be formed by this process. However, the as-cast component typically includes large grain sizes and may contain casting defects, such as porosity and nonmetallic inclusions.

A slight variation to this manufacturing process is centrifugal casting. In centrifugal casting, a mold is rotated about its axis at various speeds (e.g., 300 to 3000 rpm) as molten material is poured into the mold. The speed of the rotation and material pouring rate vary with the material used, as well as the size and shape of the component being cast. When the molten material is poured into the rotating mold, the molten material is thrown towards the outer mold wall, which is typically held at a much lower temperature than the molten material, where it begins to solidify upon cooling. Near the outer mold wall, heterogeneous nucleation occurs relatively rapidly, and a fine, equiaxed grain structure is usually obtained in the outer diameter of the component adjacent to the mold, in an exterior zone. This rapid cooling effect of the mold induces directional solidification across the component's wall. A columnar zone begins to form with a dendritic growth direction in each columnar grain parallel to the heat flow direction. The growth of these crystals stops when they meet the grains growing from the inner diameter of the component in an interior zone. As the component's inner diameter is in contact with air, the solidification rate in the interior zone is much lower than in the exterior zone, resulting in coarser grains in the inner diameter than are in the middle area or the outer diameter of the component. Consequently, centrifugal casting usually results in a finer grain structure than regular casting with a fine-grained outer diameter, but with an inner diameter usually having more impurities and inclusions.

The resulting centrifugally cast component, however, presents many challenges for subsequent metal forming processes due to its different grain sizes in the various zones, along with its radially-oriented columnar grain structure. Due to these difficulties, cast and centrifugally cast components are frequently subjected to subsequent warm or hot forming manufacturing processes that are conducted above the recrystallization temperature of the material, or are subjected to numerous annealing steps in between the metal forming processes. However, warm and hot forming processes affect the mechanical properties and the dimensional accuracies of a component, making it difficult to meet requirements with tight tolerances. In addition, centrifugal cast components have not been acceptable for applications with high internal pressure or where corrosive and/or erosive products are present, such as in environments where OCTG components are used. The centrifugal casting process tends to produce a microstructure with undesirable porosity causing crack initiation sites. Centrifugally cast components also may exhibit segregation of the solute alloying elements to Laves and carbide phases, depending upon the mold speed used during casting. Microstructural results show that the predominant crack or fracture path in centrifugal castings is frequently associated with the carbide or Laves phases in the interdendritic regions. It is well known that alloy inhomogeneities are responsible for the reduction of the tensile and creep-rupture performance of materials at room temperature and elevated temperatures. One of the main problems of centrifugal cast components is the non-uniform microstructure through the cross section of the wall thickness. The banded structure downgrades the physical and mechanical properties of the material and results in stratification.

SUMMARY OF EMBODIMENTS

In accordance with one embodiment of the invention, a method of producing a seamless, composite tubular product includes centrifugally casting a metal or alloy into a tubular workpiece having an inner diameter. The method then centrifugally casts a corrosion resistant alloy in the inner diameter of the tubular workpiece to form a composite tubular workpiece having an inner diameter and an outer diameter, the inner diameter of the composite tubular workpiece formed of the corrosion resistant alloy and the outer diameter of the composite tubular workpiece formed of the metal or alloy. The method then subjects the composite tubular workpiece to at least about a 25% wall reduction at a temperature below a recrystallization temperature of the composite tubular workpiece using a metal forming process. The metal forming process includes radial forging, rolling, pilgering, and/or flowforming.

In some embodiments, the method further includes centrifugally casting one or more metals or alloys in the inner diameter of the tubular workpiece before centrifugally casting the corrosion resistant alloy. The wall reduction may be at least about 35% or at least about 50%. The 35% or 50% wall reduction may include at least two reductions. The first reduction may be at least about a 25% wall reduction. The corrosion resistant alloy may include a stainless steel alloy, a titanium-based alloy, a nickel-based alloy, a cobalt-based alloy and/or a zirconium-based alloy. The method may further include removing material from the outer diameter of the composite tubular workpiece before subjecting the composite tubular workpiece to the wall reduction. The method may further include annealing the composite tubular workpiece after subjecting the composite tubular workpiece to the wall reduction. The method may further include subjecting the composite tubular workpiece to at least about a 10% wall reduction after annealing the composite tubular workpiece. The method may further include annealing, age hardening, and then annealing the workpiece before subjecting the composite tubular workpiece to the wall reduction. The method may further include forming a rifling on an inner diameter of the composite tubular workpiece. The metal forming process may further include providing at least two rollers having a displacement from one another in an axial direction with respect to the composite tubular workpiece and compressing the outer diameter of the composite tubular workpiece with the rollers at a temperature below the recrystallization temperature of the composite tubular workpiece using a combination of axial and radial forces so that the mandrel contacts the inner diameter and imparts a compressive hoop stress to the inner diameter of the composite tubular workpiece. The method may further include removing material from the inner diameter of the tubular workpiece before centrifugally casting the corrosion resistant alloy. The method may further include removing material from the inner diameter of the composite tubular workpiece before subjecting the composite tubular workpiece to the wall reduction. The wall reduction may be from about 25% to about 75%. Embodiments may include a tubular component produced according to the method.

BRIEF DESCRIPTION OF THE DRAWINGS

The foregoing features of the invention will be more readily understood by reference to the following detailed description, taken with reference to the accompanying drawings, in which.

DESCRIPTION OF ILLUSTRATIVE EMBODIMENTS

Various embodiments of the present invention provide a method of producing a seamless, composite tubular product from a centrifugally cast, corrosion resistant alloy. The method entails centrifugally casting a metal or alloy, e.g., steel or corrosion resistant alloy, to form the outer layer or shell in a centrifugal casting and then using that shell as the mold for subsequently centrifugally casting a corrosion resistant alloy in order to form a composite tubular workpiece made of at least the two materials. The process then cold-works the composite tubular workpiece with at least about a 25% wall reduction using a metal forming process, such as flowforming, in order to bond or clad the two or more layers together when forming the workpiece into the desired length, thickness, and/or shape. Other metal forming processes may also be used such as radial forging, rolling and/or pilgering. Preferably, the metal forming process includes a series of smaller and smaller reductions. Typically, in wrought material like billets or extrusions, if smaller incremental flowforming passes are used, the material near the outer diameter of the component is subjected to enough deformation that the material plastically deforms, but the inner diameter does not sufficiently plastically deform. This unacceptably leads to the material ripping apart. Surprisingly, it was found that in centrifugally cast corrosion resistant alloys a series of smaller incremental passes may be used and allows the large radially-oriented grain structure to be realigned along the longitudinal direction. This may be due, in part, to the different grain structures present in the inner and outer diameter of a centrifugally cast component. When at least a 25% wall reduction is used, both the outer and inner diameters of the workpiece plastically deforms sufficiently enough. After this initial first reduction, smaller incremental reductions may also be used. Thus, embodiments allow the centrifugally cast composite workpiece to be formed into a high strength, composite corrosion resistant component without having to undergo a series of hot work and cold work tube reductions. Details of illustrative embodiments are discussed below.

Figure 1:
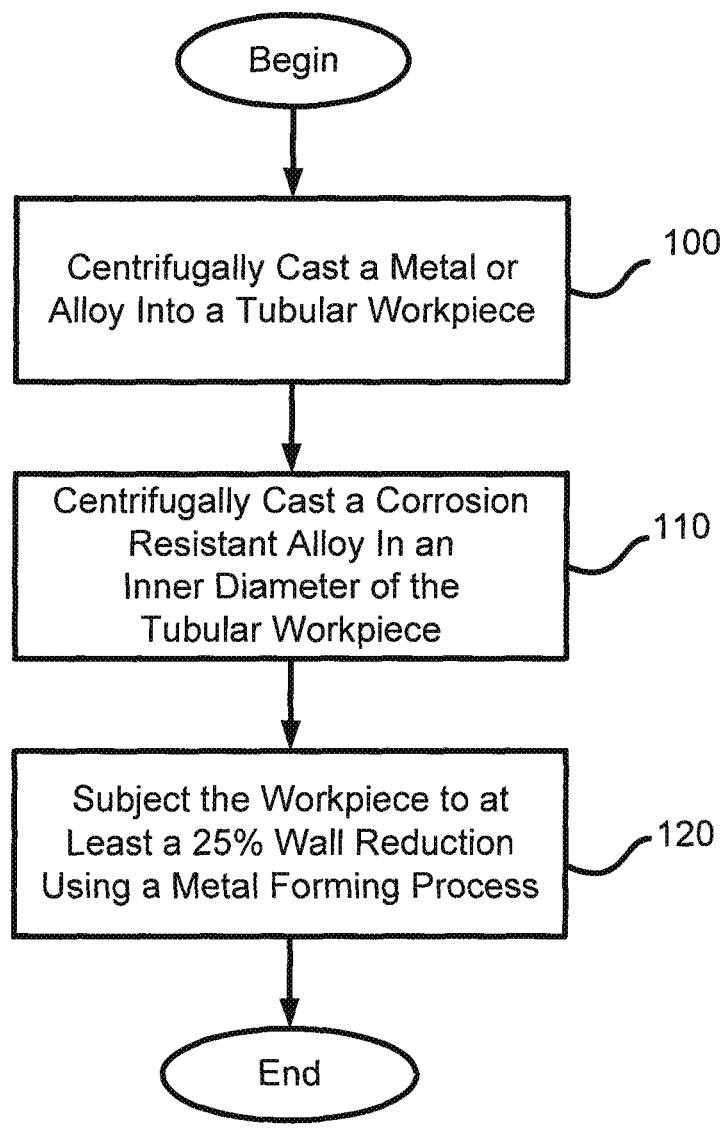
FIG. 1 shows a process of producing a seamless, composite tubular product according to embodiments of the present invention.

FIG. 1 shows a process of producing a seamless, composite tubular product according to embodiments of the present invention. The process begins at step 100, in which a metal or alloy is centrifugally cast into a tubular workpiece in order to form the mold for another centrifugal casting. For example, any metal or alloy that is able to be centrifugally cast may be used for the outer layer or mold, such as steel or another corrosion resistant alloy. In step 110, a corrosion resistant alloy is centrifugally cast in an inner diameter of the tubular workpiece in order to form a composite tubular workpiece. Preferably, the second centrifugal casting is formed within the inner diameter of the first centrifugal casting in such a way so as to reduce or eliminate the formation of any intermetallic layer between the two castings. Appropriate methods to reduce or eliminate the formation of any intermetallic layers are known in the art, e.g., U.S. Pat. No. 5,558,150, which is incorporated by reference herein in its entirety. One or more other metals or alloys may also be centrifugally cast in the inner diameter of the tubular workpiece before centrifugally casting the corrosion resistant alloy in order to form a multi-layer composite tubular workpiece. The corrosion resistant alloy may include a stainless steel alloy, a titanium-based alloy, a nickel-based alloy, and/or a zirconium-based alloy (e.g., alloys such as alloy 28, 316, 625, 718, 825, 925, G-3, 050, C-276, 22Cr, 25Cr, Duplex stainless steel, Nitronic stainless steel, Nickel 200, Monel 400 and Inconel 600). Corrosion resistant alloys may be used in a variety of different applications. Thus, this listing of specific alloys is merely intended to be illustrative of suitable materials for use in embodiments of the invention.

Figure 2:
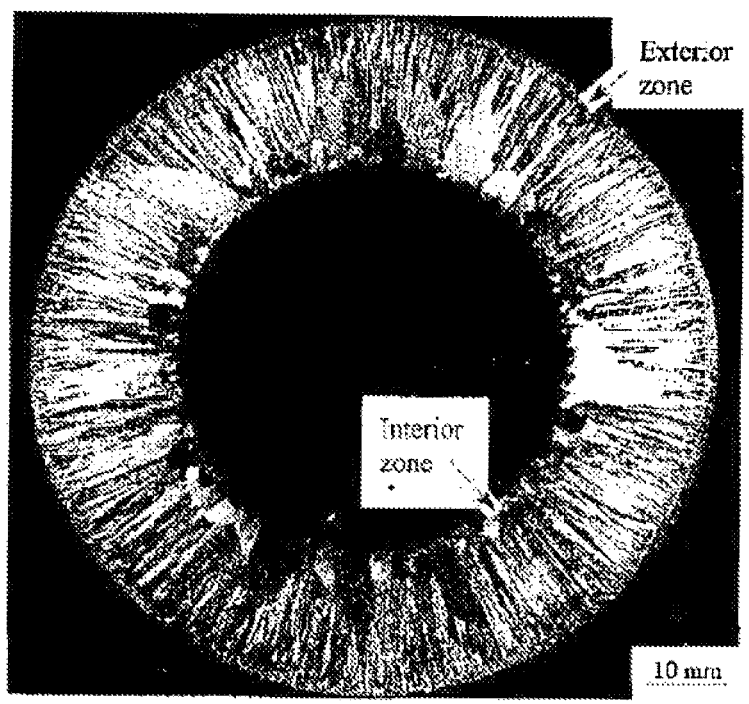
FIG. 2 is a macrograph showing a transverse cross-sectional view of a centrifugally cast tube before cold-working according to embodiments of the present invention.
Figure 3:
FIG. 3 is a photomicrograph showing a longitudinal cross-sectional view of a centrifugally cast stainless steel tube before cold-working according to embodiments of the present invention.
Figure 4:
FIG. 4 is a photomicrograph showing a transverse cross-sectional view of a centrifugally cast stainless steel tube before cold-working according to embodiments of the present invention.

The centrifugal casting process may use a variety of parameters (e.g., rotation speed, cooling rate, etc.) depending upon the materials used and the dimensions of the part produced. For example, a 316 stainless steel material may be formed having a one-inch thick sidewall. As mentioned above, a centrifugally cast tubular workpiece before cold working typically includes three basic solidification zones, such as shown in FIG. 2. As shown, the exterior zone consists of a fine, equiaxed grain structure near the outer diameter of the workpiece, the columnar zone consists of columnar grains oriented parallel to the radial direction, and the interior zone consists of a coarse, equiaxed grain structure. FIGS. 3 and 4 are photomicrographs showing a longitudinal and transverse cross-sectional view, respectively, of a centrifugally cast 316 stainless steel tube before cold working showing the radially-oriented, large columnar grain structure. In the composite tubular workpiece, both the outer layer formed of the metal or alloy and the inner layer formed of the corrosion resistant alloy may each include the three solidification zones.

For heat treatable or age hardenable materials, such as 410 stainless steel or 718 Inconel, an optional heat treatment may be used on the workpiece after the two centrifugal casting processes. For example, the workpiece may be age hardened and annealed one or more times. The phase transformations from the heat treatment cycle may help reduce the large, columnar grains in the centrifugal casting before any subsequent metal forming process is used. The heat treatments may include an annealing, age hardening and annealing treatment in order to break up and somewhat refine the cast grain structure.

Figure 5A:
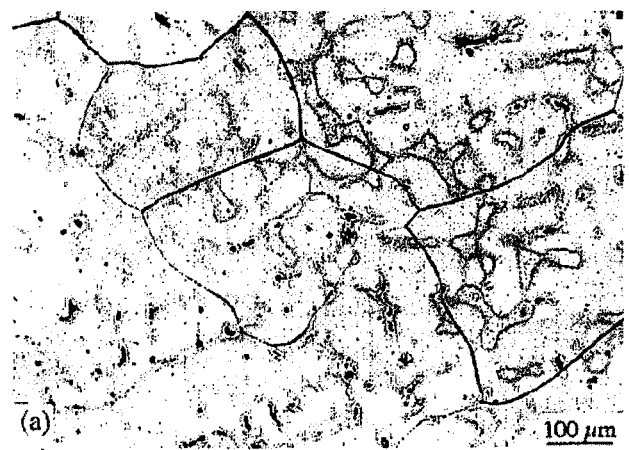
FIGS. 5A and 5B are photomicrographs showing the as-cast microstructure in the interior zone and exterior zones, respectively, of the centrifugally cast tube shown in FIG. 2.
Figure 5B:
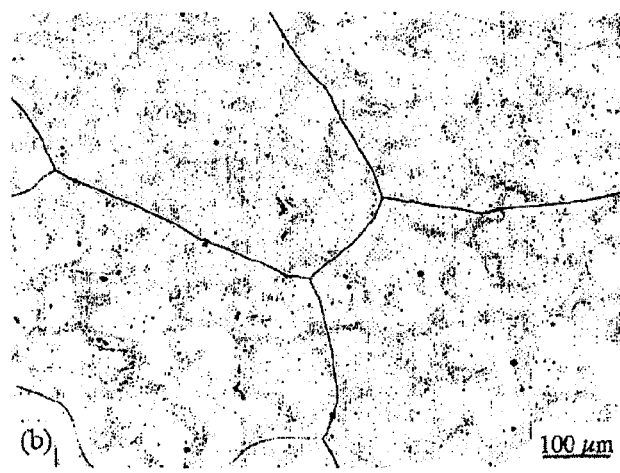

In a centrifugally cast composite tubular workpiece, the interior zone usually has limited ductility compared to the rest of the workpiece due, in part, to higher porosity present in this zone. For example, FIGS. 5A and 5B are photomicrographs showing the as-cast microstructure in the interior zone and exterior zones, respectively. As shown, a higher pore volume fraction is present in the interior zone than the exterior zone. One of the basic causes for porosity in metals and alloys is gas evolution during solidification. In centrifugal casting, when the molten material is poured into the rotating mold, bubbles of gas may form in the material. As these bubbles have a low density, they are subjected to a lower centrifugal force than the melt, and will tend to collect in the interior zone on the inner diameter of the centrifugally cast component. The heterogeneity of ductility between the three zones introduces a risk factor during the subsequent processing stages. Therefore, the amount of deformation each zone is subjected to needs to be considered when designing the processing stages to maintain uniform quality in the final product along the width of the tube.

Returning to the process of FIG. 1, the composite tubular workpiece is subjected to at least a 25% wall reduction at a temperature below the recrystallization temperature of the composite tubular workpiece using a metal forming process in step 120. Optionally, material may be removed from the inner diameter of the composite tubular workpiece by any known removal process, such as machining or honing. Although the remaining discussion will be in the context of using flowforming as the metal forming process, discussion of flowforming is illustrative and not intended to limit the scope of various embodiments. Accordingly, metal forming processes may include other metal forming processes that apply compressive forces to reduce an inner and outer diameter of a tubular workpiece in order to obtain a reduction in the wall thickness of the component, such as rolling, radial forging and pilgering.

Flowforming is a metal forming process used to produce precise, thin wall, cylindrical components. Flowforming is typically performed by compressing the outer diameter of a cylindrical workpiece over an inner, rotating mandrel using a combination of axial, radial and tangential forces from two or more rollers. The material is compressed above its yield strength, causing plastic deformation of the material. As a result, the outer diameter and the wall thickness of the workpiece are decreased, while its length is increased, until the desired geometry of the component is achieved. Flowforming is a cold-forming process. Although adiabatic heat is generated from the plastic deformation, the workpiece, mandrel and rollers are typically flooded with a refrigerated coolant to dissipate the heat. This ensures that the material is worked well below its recrystallization temperature. Being a cold-forming process, flowforming increases the material's strength and hardness, textures the material, and often achieves mechanical properties and dimensional accuracies that are far closer to requirements than any warm or hot forming manufacturing process known to the inventor.

Two examples of flowforming methods are forward flowforming and reverse flowforming. Generally, forward flowforming is useful for forming tubes or components having at least one closed or semi-closed end (e.g., a closed cylinder). Reverse flowforming is generally useful for forming tubes or components that have two open ends (e.g., a cylinder having two open ends). In some cases, a combination of forward and reverse flowforming may be utilized to successfully achieve the desired geometry. Typically, forward flowforming and reverse flowforming may be performed on the same flowforming machine by changing the necessary tooling.

Figure 6:
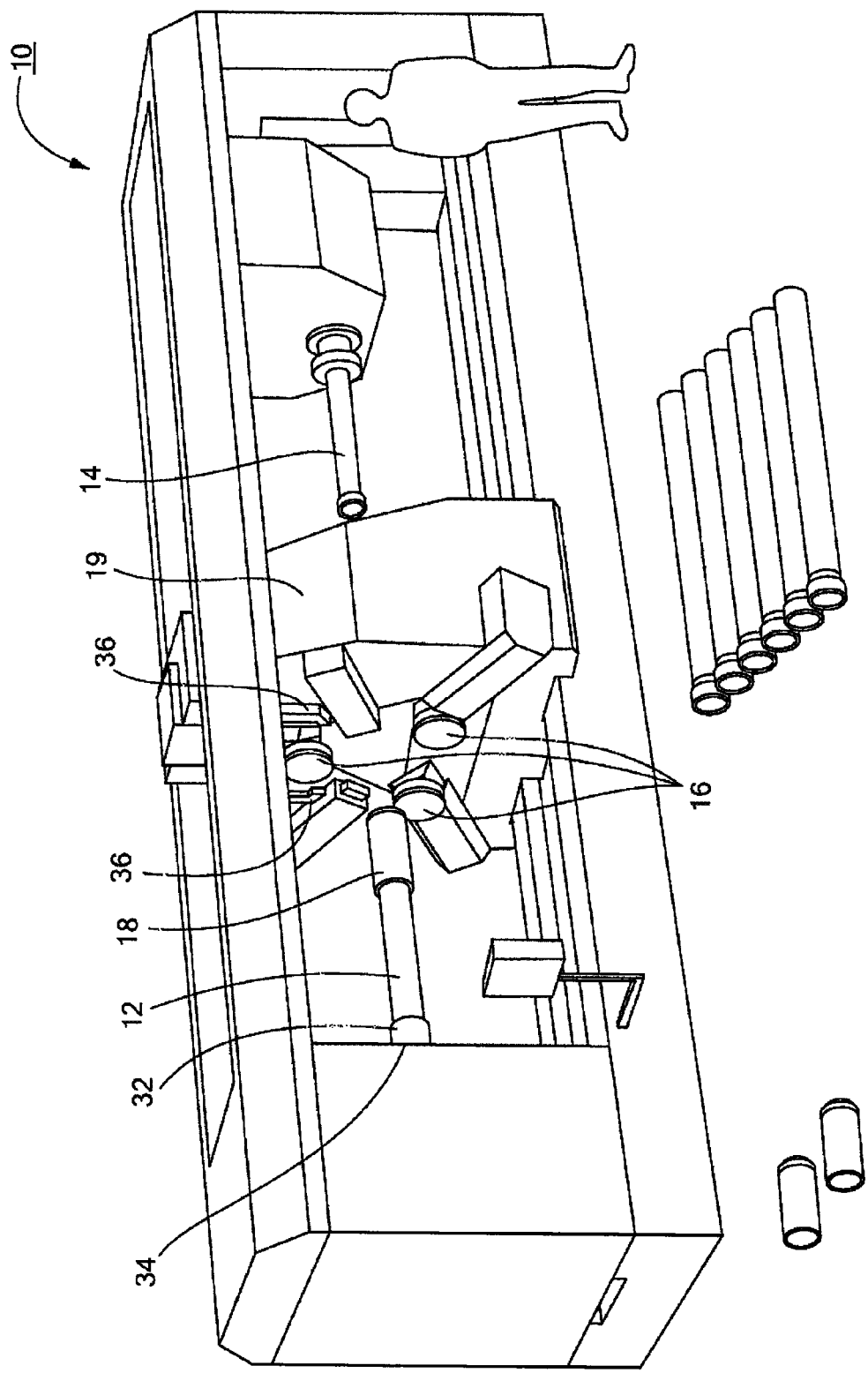
FIG. 6 schematically shows an illustrative flowforming device according to embodiments of the present invention.

FIG. 6 schematically shows an illustrative flowforming device 10 according to some embodiments of the present invention. In this case, the flowforming device 10 is configured for forward flowforming. The flowforming device 10 includes a mandrel 12 for holding a cylindrical workpiece 18, a tailstock 14 that secures the workpiece 18 to the mandrel 12, two or more rollers 16 for applying force to the outer surface of the workpiece 18, and a movable carriage 19 coupled to the rollers 16. As shown in FIG. 6, the rollers 16 may be angularly equidistant from each other relative to the center axis of the workpiece 18. The rollers 16 may be hydraulically-driven and CNC-controlled.

Figure 7:
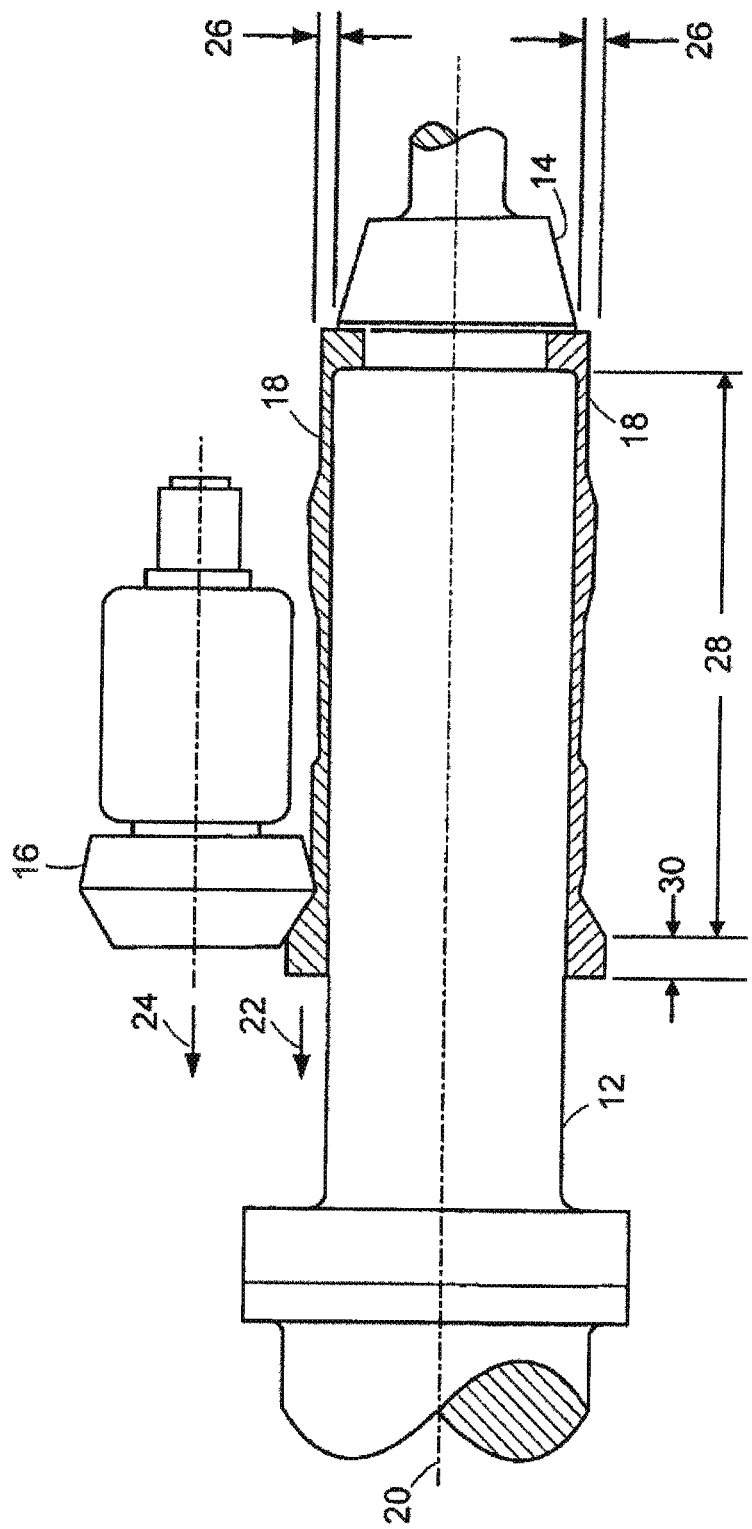
FIG. 7 schematically shows a side-view of a workpiece undergoing a forward flowforming process according to embodiments of the present invention.

FIG. 7 shows a side-view of a workpiece 18 undergoing a forward flowforming process. During this process, the workpiece 18 may be placed over the mandrel 12 with its closed or semi-closed end toward the end of the mandrel 12 (to the right side of the mandrel, as shown in FIG. 6). The workpiece 18 may be secured against the end of the mandrel 18 by the tailstock 14, e.g., by means of a hydraulic force from the tailstock 14. The mandrel 12 and workpiece 18 may then rotate about an axis 20 while rollers 16 are moved into a position of contact with the outer surface of the workpiece 18 at a desired location along its length. The headstock 34 rotates or drives the mandrel 12 and the tailstock 14 provides additional help to rotate the mandrel 12, so that the long mandrel 12 spins properly.

The carriage 19 may then move the rollers 16 along the workpiece 18 (traveling from right to left, as shown in FIG. 6), generally in direction 24. The rollers 16 may apply one or more forces to the outside surface of the workpiece 18 to reduce its wall thickness 26 and its outer diameter, e.g., using a combination of controlled radial, axial and tangential forces. One or two jets 36 may be used to spray coolant on the rollers 16, workpiece 18 and mandrel 12, although more jets may be used to dissipate the adiabatic heat generated when the workpiece 18 undergoes large amounts of plastic deformation. The mandrel 12 may even be submersed in coolant (not shown), e.g., in a trough type device, so that the coolant collects and pools on the mandrel 12 to keep the workpiece 18 cool.

Rollers 16 may compress the outer surface of the workpiece 18 with enough force that the material is plastically deformed and moves or flows in direction 22, generally parallel to axis 20. Rollers 16 may be positioned at any desired distance from the outer diameter of mandrel 12 or the inner wall of workpiece 18, to produce a wall thickness 26 that may be constant along the length of the workpiece 18 or varied, as shown in FIG. 7. Length 28 represents the portion of the workpiece 18 that has undergone the flowforming process, whereas length 30 is the portion that has yet to be deformed. This process is termed "forward flowforming" because the deformed material flows in the same direction 22 as the direction 24 that the rollers are moving.

Figure 8:
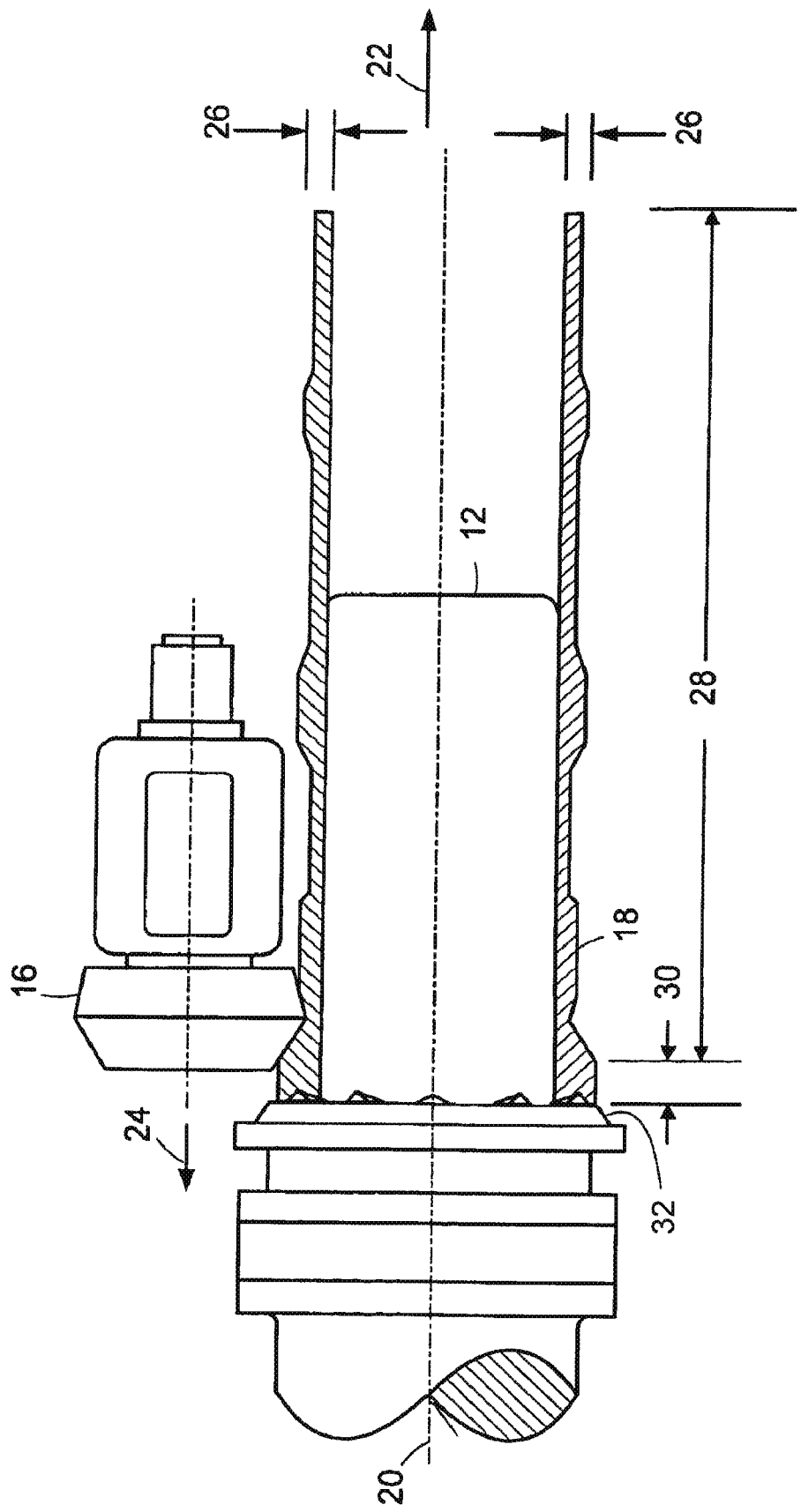
FIG. 8 schematically shows a side-view of a workpiece undergoing a reverse flowforming process according to embodiments of the present invention.

In reverse flowforming, a flowforming device may be configured in a similar manner to that shown in FIG. 6, but a drive ring 32, rather than the tailstock 14, secures the workpiece 18 to the mandrel 12. As shown in FIG. 6, the drive ring 32 is located near the headstock 34 at the other end of the mandrel 12. FIG. 8 shows a side-view of a workpiece undergoing a reverse flowforming process. During this process, the workpiece 18 may be placed on the mandrel 12 and pushed all the way against the drive ring 32 at one end of the mandrel 12 (to the left side, as shown in FIG. 6). Rollers 16 may be moved into a position of contact with the outer surface of the workpiece 18 at a desired location along its length. The carriage 19 may then move towards the drive ring 32 (in a right to left direction, as shown in FIG. 6) applying a force to the workpiece 18. The force may push the workpiece 18 into the drive ring 32 where it may be entrapped or secured by a series of serrations or other securing means on the face of the drive ring 32. This allows the mandrel 12 and the workpiece 18 to rotate about an axis 20 while rollers 16 may apply one or more forces to the outer surface of the workpiece 18. The material is plastically deformed and moves or flows in direction 23, generally parallel to axis 20. Similar to forward flowforming, rollers 16 may be positioned at any desired distance from the outer diameter of mandrel 12 or the inner wall of workpiece 18, to produce a wall thickness 26 that may be constant or varied along the length of the workpiece 18. Length 28 represents the portion of the workpiece 18 that has undergone the flowforming process whereas length 30 is the portion that has yet to be deformed. As the workpiece 18 is processed, it extends down the length of the mandrel 12 away from drive ring 32. This process is termed "reverse flowforming" because the deformed material flows in the direction 22 opposite to the direction 24 that the rollers are moving.

In addition to flowforming parts over a smooth mandrel to create a smooth inner diameter of the flowformed tube, splines or rifling may be formed into the bore of a flowformed tube. This may be accomplished by having the outer surface of the mandrel 12 constructed in such a way as to impart rifling, grooves, notches, or other configurations to the inner surface of the workpiece as it is flowformed. For example, the mandrel may be constructed with spiral, straight, periodic, or other desired ridges on its surface. These ridges leave the rifling, grooves, notches and/or other configurations in the inner surface of the workpiece after the final flowforming pass is completed. Alternatively, rifling and/or other configurations may be imparted to the inner surface of the workpiece by, for example, appropriate machining of the inner surface of the workpiece after the flowforming process is completed.

When the material is plastically deformed and trapped/compressed onto the hard mandrel under the set of rotating rollers, large wall reductions may be realized at one time. In centrifugally cast corrosion resistant alloys, if less than a 20% wall reduction is used per flowform pass, the outermost part of the workpiece may be plastically deformed, but the material closest to the inner mandrel may not have enough plastic deformation and the material may catastrophically tear apart during processing. However, if too large of wall reductions are used in one pass (e.g., greater than 75%, or maybe even as low as 65%), the workpiece may not be able to be acceptably processed. The flowforming process is unable to substantially move the material and the inner diameter develops a roughened texture. Therefore, it was discovered that a certain amount of wall reduction was needed on the first pass with smaller reductions used after the first pass, if necessary. When at least a 25% wall reduction is used, both the outer and inner diameters of the workpiece plastically deforms sufficiently enough. The flowforming process homogenously "refines" the grains' size, and realigns the microstructure, relatively uniformly, in the longitudinal direction, parallel to the center line of the flowformed tube. The flowforming process may be, conducted in one or more flowforming passes. When two or more passes are used, the first pass, preferably, is larger than the subsequent passes, and is at least a 25% wall reduction. For example, for a 35% wall reduction using more than one pass, the first pass may be at least a 25% wall reduction and the second pass may be a 10% wall reduction. In another example, for a 50% wall reduction using more than one pass, the first pass may be at least a 25% wall reduction, the second pass may be a 15% wall reduction, and the third pass may be a 10% wall reduction. Preferably, the wall reduction ranges from about 25% to about 75% in one pass.

With the degree of cold work, the hardness and tensile strength of a material are increased while the ductility and impact values are lowered. In addition, the porosity of the castings should be substantially eliminated through the cold work deformations. Cold working also usually reduces the grain size of the material. When a material is cold worked, microscopic defects are nucleated throughout the deformed area. As defects accumulate through deformation, it becomes increasingly more difficult for slip, or the movement of defects, to occur. This results in a hardening of the material. If a material is subjected to too much cold work, the hardened material may fracture. Thus, with each flowforming pass, the material becomes harder and less ductile, so a series of smaller and smaller reductions may be used after the first pass.

In addition to an increase in the biaxial strength and wear resistance, embodiments may also provide compressive residual stresses at the inner diameter of the component induced by an autofrettage process. Autofrettage is a metal fabrication technique used on tubular components to provide increased strength and fatigue life to the tube by creating a compressive residual stress at the bore. During a typical autofrettage process, a pressure is applied within a component resulting in the material at the inner surface undergoing plastic deformation while the material at the outer surface undergoes elastic deformation. The result is that after the pressure is removed, there is a distribution of residual stress, providing a residual compressive stress on the inner surface of the component. In embodiments of the present invention in the final flowforming pass, the rollers 16 may be configured in such a way that the rollers compress the outer diameter of the workpiece using a combination of axial and radial forces so as to cause the inner diameter of the workpiece 18 to be compressed onto the mandrel 12 with sufficient force so that the inner diameter plastically deforms sufficiently enough, imparting a compressive stress to the inner diameter. This may be accomplished by pulling the rollers sufficiently apart from one another. The flowform process then causes the workpiece 18 to compress against and grip the mandrel 12 compared to the workpiece 18 just releasing from or springing back off of the mandrel 12 which is what typically occurs during a standard flowforming process. Causing the inner diameter to compress against the mandrel 12 in this way imparts a compressive hoop stress on the inner diameter of the flowformed component.

Figure 9:
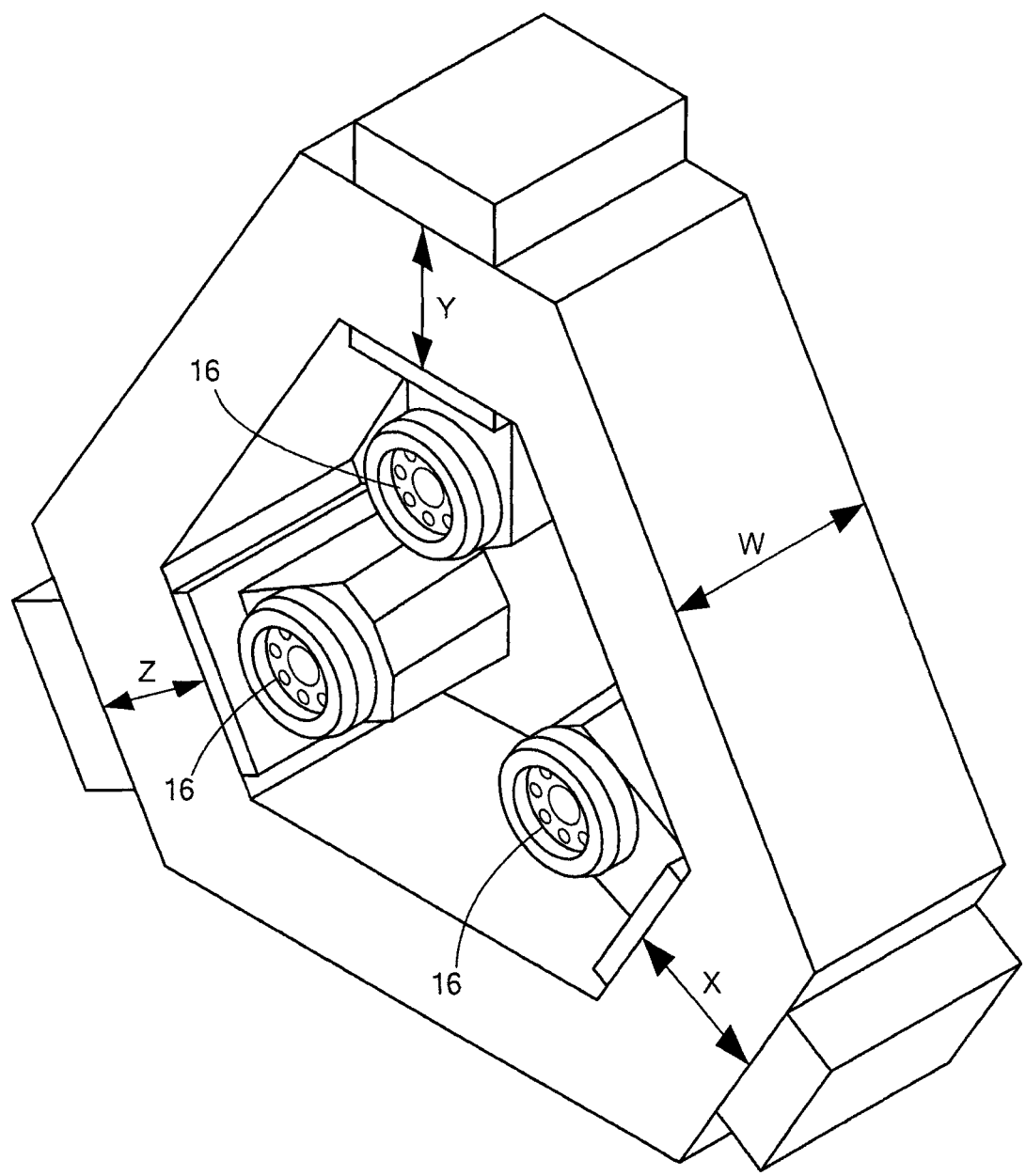
FIG. 9 schematically shows a perspective view of rollers according to embodiments of the present invention.
Figure 10:
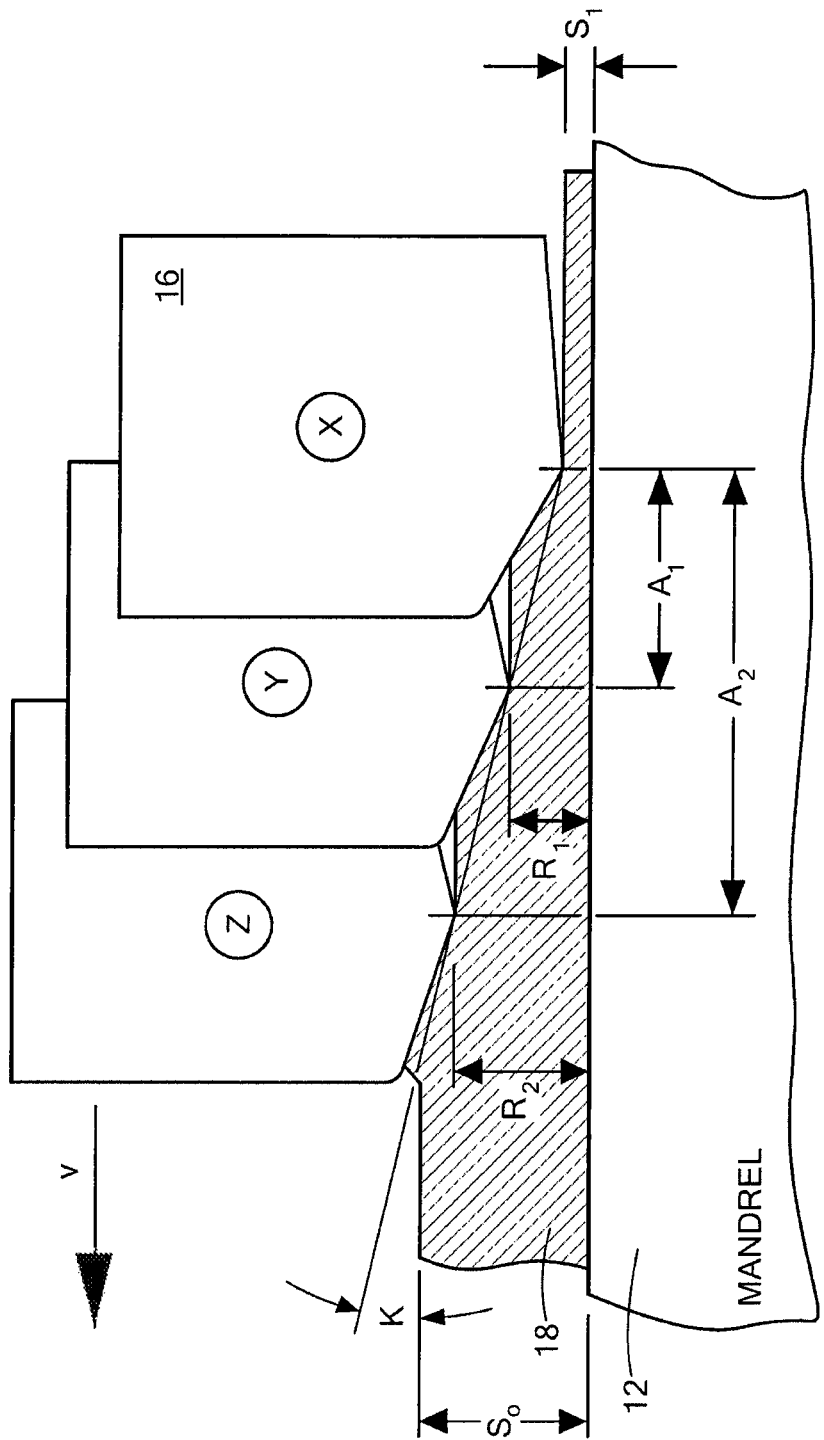
FIG. 10 schematically shows a side-view of a roller configuration with a workpiece undergoing a forward flowforming process according to embodiments of the present invention.

FIGS. 9 and 10 show a perspective view and side view, respectively, of a roller configuration according to embodiments of the present invention. FIG. 9 shows a carriage that houses three flowforming rollers (shown as X, Y and Z in FIG. 10) that may move along three axes (shown as X-, Y- and Z-axes) and which are radially located around the spindle axis, e.g., at 120° apart from one another. Although the figures show three rollers, the process may use two or more rollers. The independently programmable X, Y and Z rollers provide the necessary radial forces, while the right to left programmable feed motion of the W-axis applies the axial force. Each of the rollers may have a specific geometry to support its particular role in the forming process. In addition, the position of the rollers 16 may be staggered with respect to one another. The amount of stagger may be varied and may be based on the initial wall thickness of the workpiece and the amount of wall reduction desired in a given flowforming pass. For example, as shown in FIG. 10, $S_0$ shows the wall thickness of a workpiece before a given flowforming pass and $S_1$ shows its wall thickness after the flowforming process with the rollers 16 moving in the v direction. The rollers 16 may be staggered axially along an axial direction of the workpiece 18 (shown as the W-axis in FIG. 9) and may be staggered radially with respect to the centerline or inner diameter of the workpiece (along the X-, Y- and Z-axes), preferably to apply a relatively uniform compression to the outside of the workpiece 18. For example, as shown in FIG. 10, roller X may be separated from roller Y by a displacement or distance $A_1$ and may be separated from roller Z by a distance $A_2$ along an axial direction of the workpiece 18. Similarly, roller X may be radially displaced from the inner diameter of the workpiece a distance, $S_1$, which is the desired wall thickness of the workpiece 18 after a given flowforming pass, roller Y may be radially displaced a distance, $R_1$, and roller Z may be radially displaced a distance, $R_2$. As shown, an angle K may be used to help determine the amount of radial staggering once an axial staggering amount has been determined.

The more the rollers X, Y and Z are separated from one another the greater the helical twist imparted to the grain structure of the workpiece. A lubricant should be used between the inner diameter of the workpiece 18 and the mandrel 12 in order to reduce the problems of the workpiece 18 becoming stuck or jammed onto the mandrel 12 during this process. The compressive hoop stress imparted to the component in this way should reduce the probability of crack initiation and slow down the growth rate of any crack that may initiate on the inner diameter of the component, effectively improving the fatigue life of the tubular component. One benefit of this process is that the amount of compressive stress imparted to the inner diameter may be varied along the length of the tube depending on the roller configuration. For example, the rollers may be configured in such a way that a compressive stress is only imparted to one portion of the tube, e.g., on one end or in the middle of the tube.

Figure 11:
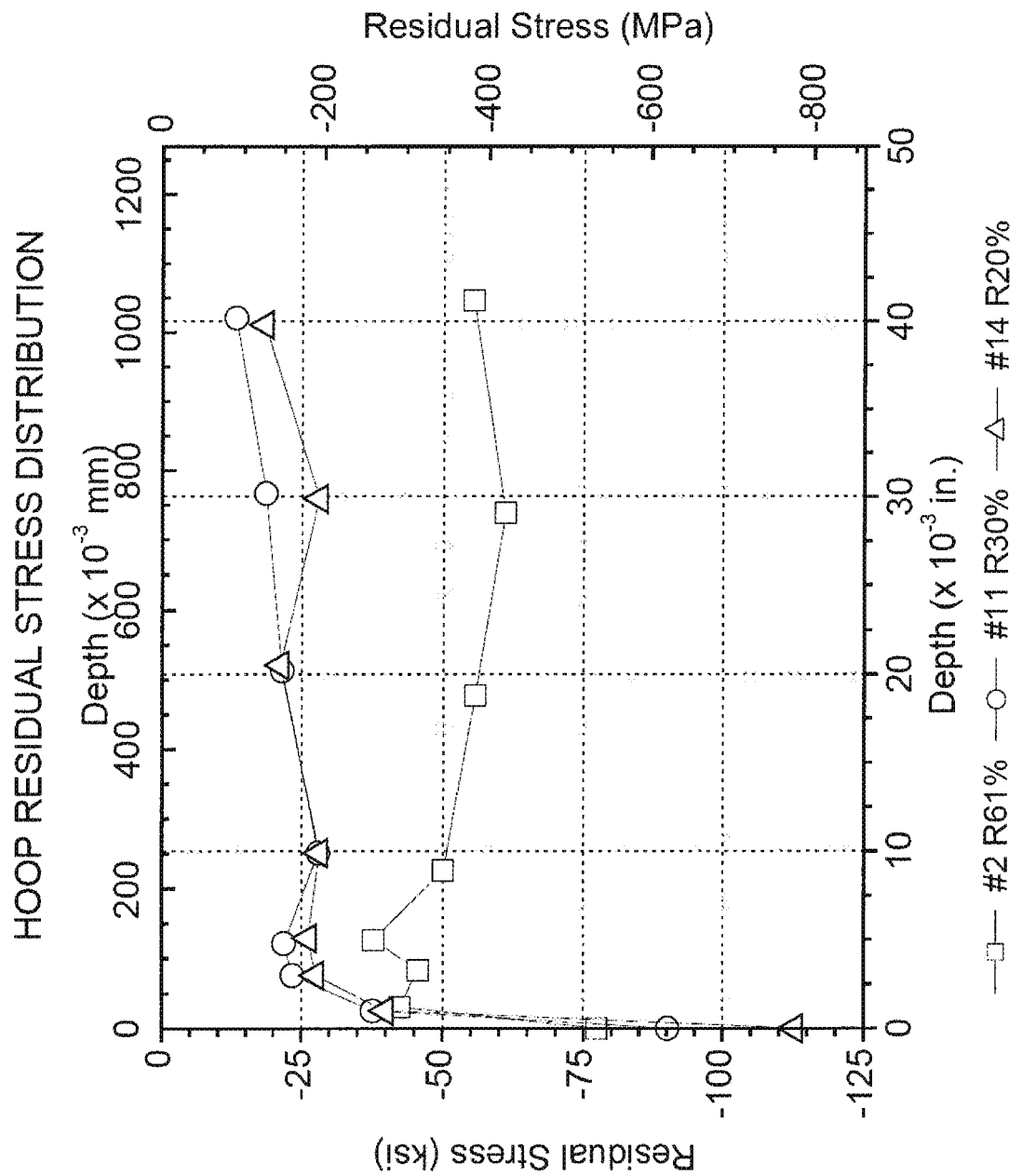
FIG. 11 shows a graph of residual hoop stress distribution for tubular components made of a superalloy material that has undergone an autofrettage process according to embodiments of the present invention.

FIG. 11 shows a graph of the residual hoop stress distribution for tubular components made of a superalloy material that have undergone an autofrettage process. As shown, three tubular workpieces of L-605 material were formed and each workpiece's wall thickness was reduced by approximately 61%, 30% and 20% total wall reduction, respectively, according to embodiments of the present invention. In this case, the three samples had final dimensions of about one inch for the inner diameter and about 0.100-0.150" for the wall thickness. As shown in FIG. 11, each workpiece exhibited a residual compressive stress at its inner surface with a smaller residual compressive stress still seen within the workpiece for the depth measured in the samples. The 20% wall reduction workpiece showed a higher residual hoop stress at the inner surface (e.g., 0 depth from the inner surface) than the 61% wall reduction workpiece, although the higher 61% wall reduction exhibited a larger compressive stress within the workpiece (e.g., about $5-40\times10^{-3}$ in. depth) than the 30% or 20% workpiece.

Figure 12:
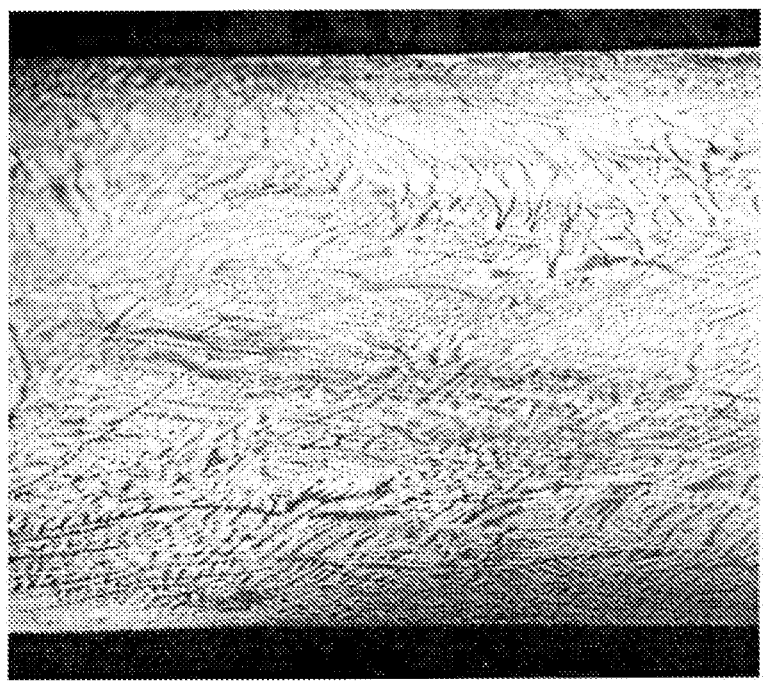
FIG. 12 is a photomicrograph showing a longitudinal cross-sectional view of a centrifugally cast stainless steel tube after flowforming according to embodiments of the present invention.
Figure 13A:
FIGS. 13A and 13B are photomicrographs showing the outer diameter and inner diameter areas, respectively, of the flowformed, centrifugally cast stainless steel tube shown in FIG. 10 at a 500× magnification.
Figure 13B:
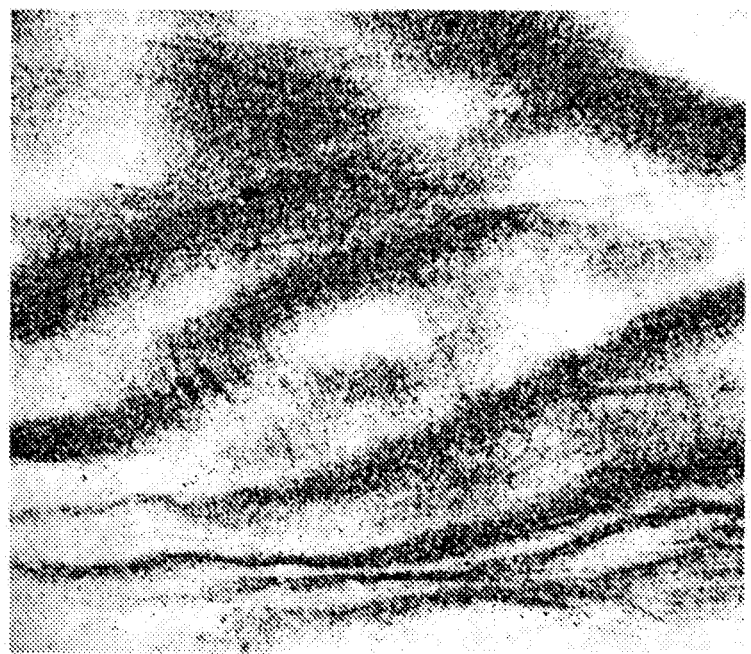

FIG. 12 is a photomicrograph showing a longitudinal cross-sectional view of a centrifugally cast 316 stainless steel tube subjected to a flowforming process. The sample was etched in order to show the grain structure. The outer diameter of the component is shown at the top of FIG. 12 and the inner diameter is shown at the bottom. FIGS. 13A and 13B are photomicrographs showing the outer diameter and inner diameter areas, respectively, of the flowformed, centrifugally cast 316 stainless steel tube at a 500× magnification. As shown, there is a significant difference in the amount of cold work the grain structures have undergone in these two areas. In the outer diameter, the grain structure is more deformed and flattened than the inner diameter with the grains substantially aligned in the longitudinal direction, parallel to the center line of the flowformed component. In the inner diameter, the grain structure is less deformed than the outer diameter with the grains having some angled grain flow toward the radial direction. The outer diameter of the centrifugally cast flowformed component also exhibited substantially different hardness properties than the inner diameter. The hardness near the outer diameter measured a hardness level of Rockwell C 39-42, whereas the hardness near the inner diameter was Rockwell C 26-29.

After the one or more flowforming passes, the component may undergo additional post processing, such as a heat treatment. As known by those skilled in the art, a material that has been hardened by cold working may be softened by annealing. Annealing may relieve stresses, allow grain growth, or restore the original properties of the alloy depending on the temperature and duration of the heat treatment used. Ductility may also be restored by annealing. Thus, after heat treating, the component may undergo one or more additional flowforming passes without fracturing.

As mentioned above, the metal forming may include other cold working processes other than flowforming, such as pilgering, radial forging, and/or rolling. As known by those skilled in the art, in the pilgering process, the tubular component is rotated and reduced by forging and elongating the tube stepwise over a stationary tapered mandrel reducing the tube. Two rolls or dies, each with a tapering semi circular groove running along the circumference engage the tube from above and below and rock back and forth over the tube (the pass length) while a stationary tapering mandrel is held in the center of the finished tube. At the beginning of a stroke or pass, the circular section formed between the grooves of the two opposing rolls corresponds to the diameter of the tube and to the thickest section of the mandrel. As the dies move forward over the tube, the circular section reduces in area until, at the end of the pass length, the circular section corresponds to the outer diameter of the finished tube and the inner mandrel diameter corresponds to the inner diameter of the finished tube, resulting in a longer length, smaller outer and inner diameter finished tube. As known by those skilled in the art, a radial forge process may include four hammers moving in and out and hammering the workpiece over a mandrel. The driver and counter holder move the workpiece over the mandrel and into the reciprocating hammers. As known by those skilled in the art, a rotary swage process may include dies that rotate as a group inside of a stationary housing as the workpiece is pushed over the mandrel and into the dies which upsets/swages the material.

Although the above discussion discloses various exemplary embodiments of the invention, it should be apparent that those skilled in the art can make various modifications that will achieve some of the advantages of the invention without departing from the true scope of the invention.

What is claimed:

1. A method of making a seamless, tubular article, the method comprising:
    subjecting a cast tubular workpiece of a corrosion resistant alloy to at least a 35% wall reduction including at least two reductions at a temperature below a recrystallization temperature of the workpiece using a metal forming process comprising at least one of radial forging, rolling, pilgering, and flowforming, and wherein a first reduction applied to the cast tubular workpiece is at least a 25% wall reduction;
    wherein the cast tubular workpiece is a centrifugally cast tubular workpiece comprising an inner diameter and an outer diameter.

2. The method of claim 1, wherein the wall reduction is at least 50%.

3. The method of claim 1, wherein the corrosion resistant alloy is one of a stainless steel alloy, a titanium-based alloy, a nickel-based alloy, a cobalt-based alloy, and a zirconium-based alloy.

4. The method of claim 1, wherein the corrosion resistant alloy is a duplex stainless steel alloy.

5. The method of claim 1, wherein material has been removed from the inner diameter of the cast tubular workpiece.

6. The method of claim 1, further comprising, prior to the wall reduction:
    removing material from the inner diameter of the cast tubular workpiece.

7. The method of claim 1, wherein the cast tubular workpiece is a heat treated, cast tubular workpiece.

8. The method of claim 1, further comprising, prior to the wall reduction:
    heat treating the cast tubular workpiece.

9. The method of claim 8, where the heat treating comprises at least one of age hardening and annealing.

10. The method of claim 1, wherein the metal forming process is radial forging.

11. The method of claim 1, wherein the metal forming process is rolling.

12. The method of claim 1, wherein the metal forming process is pilgering.

13. The method of claim 1, wherein the metal forming process is flowforming.

14. The method of claim 1, wherein the metal forming process comprises:
    providing at least two rollers having a displacement from one another in an axial direction with respect to the cast tubular workpiece; and
    compressing the outer diameter of the cast tubular workpiece with the rollers at a temperature below the recrystallization temperature of the workpiece using a combination of axial and radial forces so that a mandrel contacts and imparts a compressive hoop stress to the inner diameter.

15. The method of claim 1, wherein:
    the corrosion resistant alloy is a duplex stainless steel alloy; and
    the metal forming process comprises rolling.

16. A method of making a seamless tubular article from a centrifugally cast, corrosion resistant alloy, the method comprising:
    cold working a cast tubular workpiece comprising an inner diameter, an outer diameter, and a wall thickness by at least one of flowforming, radial forging, rolling, and pilgering to provide a wall reduction, wherein the cold working includes at least two wall reductions, and wherein a first wall reduction applied to the cast tubular workpiece is at least a 25% wall reduction;
    wherein the cast tubular workpiece is a centrifugally cast, tubular workpiece of a corrosion resistant alloy; and wherein the corrosion resistant alloy is selected from a stainless steel alloy, a titanium-based alloy, a nickel-based alloy, and a zirconium-based alloy.

17. The method of claim 16, wherein the corrosion resistant alloy is a duplex stainless steel alloy.

18. The method of claim 16, wherein the cold working provides a wall reduction of at least 35%.

19. The method of claim 16, wherein material has been removed from the inner diameter of the cast tubular workpiece.

20. The method of claim 16, wherein cold working the cast tubular workpiece comprises:
providing at least two rollers having a displacement from one another in an axial direction with respect to the cast tubular workpiece; and
compressing the outer diameter of the cast tubular workpiece with the rollers at a temperature below the recrystallization temperature of the corrosion resistant alloy using a combination of axial and radial forces so that a mandrel contacts and imparts a compressive hoop stress to the inner diameter of the cast tubular workpiece.

21. The method of claim 16, wherein the cast tubular workpiece is a heat treated, cast tubular workpiece.

22. The method of claim 16, further comprising, prior to the wall reduction:
heat treating the cast tubular workpiece.

23. A method of producing a seamless, tubular product, the method comprising:
subjecting a centrifugally cast tubular workpiece of a duplex stainless steel to a at least two wall reductions, and wherein a first wall reduction applied to the centrifugally cast workpiece is at least a 25% wall reduction, at a temperature below a recrystallization temperature of the duplex stainless steel using a metal forming process comprising rolling, wherein the centrifugally cast tubular workpiece includes an inner diameter and an outer diameter, and wherein material has been removed from the inner diameter.

24. The method of claim 23, wherein the at least two wall reductions provide at least a 35% wall reduction.

* * * * *